Oct. 23, 1956   J. R. JENNESS, JR   2,768,265
INFRARED DETECTOR CELL
Filed April 19, 1954
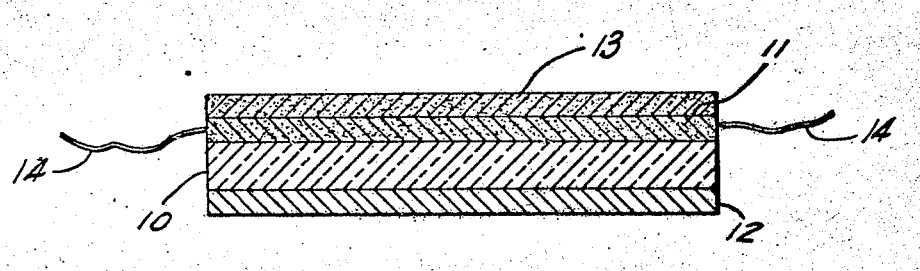
INVENTOR.
James R. Jenness Jr.
BY
Attorneys

United States Patent Office 2,768,265
Patented Oct. 23, 1956

2,768,265

INFRARED DETECTOR CELL

James R. Jenness, Jr., Southampton, Pa.

Application April 19, 1954, Serial No. 424,288

11 Claims. (Cl. 201—63)

(Granted under Title 35, U. S. Code (1952), sec. 266)

The invention described herein may be manufactured and used by or for the Government of the United States of America for governmental purposes without the payment of any royalties thereon or therefor.

This invention relates to a detector cell for infrared radiation, more particularly, it relates to photoconductive infrared detection cells, and the process for making them.

In infrared detection cells utilizing photoconductive coatings an appreciable amount of radiation is lost through reflection at the surface of the photoconductive coating, thus rendering it highly difficult to detect radiation of low intensity. Excessive reflection is due to the high index of refraction of photoconductive materials. The problem is further magnified by the fact that in prior detection cells it has been necessary to enclose the cell in an evacuated envelope to prevent exposure of the photoconductive coating, the envelope presenting a further problem in absorption and reflection of incident radiation.

It is an object of this invention to provide a means for increasing the efficiency of photoconductive infrared detection cells.

It is another object of this invention to provide a means for increasing the efficiency of a photoconductive infrared detection cell which is also effective to protect the photoconductive material from exposure to the air.

It is still another object of this invention to provide a means for decreasing the reflection of incident infrared radiation from a photoconductive surface.

It has been found that the above and other objects are accomplished by applying to the photoconductive coating of the infrared detection cell a reflection reducing coating having an optical thickness for the radiation of principal interest which is an odd multiple of one fourth the wave length of the infrared radiation of principal interest and consisting of a material having an index of refraction for the infrared radiation of principal interest less than that of the photoconductive material. The efficiency of the cell is further increased by use of a base transparent to infrared radiation which is coated with a reflecting coating on the surface opposite the photoconductive coating, the reflecting surface adapted to reflect radiation which has passed through the photoconductive coating back through the coating a second time.

The invention is best explained by reference to the accompanying drawing hereby made a part of this application and in which the single figure is a vertical cross section of the infrared detection cell of this invention. In the figure the numeral 10 represents the base of the cell. A photoconductive coating 11 is applied to the base on one side as shown and a reflecting coating 12 is applied to the opposite surface. A reflection reducing coating 13 is applied to the photoconductive coating and the photoconductive coating 11 is provided with electrical leads 14.

The base 10 is preferably made of a dielectric material such as sapphire, calcium fluoride or magnesium oxide which is transparent to infrared radiation. This is necessary when the mirror coating 12 is used so that incident radiation passing through the photoconductive coating will proceed through the base and be reflected back through the coating to produce further photoconductive action. The base need not be transparent when no mirror surface is used. The coating 11 is of a photoconductive material such as lead sulfide, lead telluride or lead selenide. It is approximately from 1 to 2 microns in thickness, the thickness being modified in the drawing, as in the case of other coatings, for the purposes of illustration. It is applied by vacuum evaporation. Other means of application may be used when suitable, such as, spraying chemical deposition or others. The mirror coating 12 may be of conventional material used for this purpose, such as silver or aluminum. It is applied by conventional techniques such as vacuum evaporation in the case of aluminum and chemical deposition or vacuum evaporation in the case of silver. The surface of the coating facing the base 10 functions to reflect radiation back through the base and into the photoconductive coating again. The reflection reducing coating 13 is restricted to a material having a number of well defined properties. To minimize the reflection of incident radiation its index of refraction should be lower than that of the photoconductive coating, limits of 1.3 to 2.5 being preferable. The index of refraction of lead sulfide, for example, is 3.9 for visible light and is believed to be about 3.5 for infrared radiation at a wavelength of 2 microns. The ideal material for a reflection reducing coating should have a refractive index, for a wavelength of 2 microns of $n=\sqrt{3.5}$ or 1.85. However, since lead sulfide reflects approximately 35% of the incident radiation, any material with an index of refraction less than that of lead sulfide, even though its refractive index does not equal the ideal value of 1.85, is effective as a coating. The material of the reflection reduction coating must be transparent to infrared radiation, a dielectric, a solid at room temperature, and capable of application as a coating. Suitable materials include magnesium fluoride, silicon monoxide, lithium fluoride, antimony trisulfide, polystyrene and others. Coating may be by evaporation, sputtering, chemical deposition, spraying or by other conventional means. The material is applied preferably in a thickness which gives an optical thickness for the infrared radiation of principal interest which is an odd multiple of one-fourth the wavelength of infrared radiation of principal interest, this being the thickness prescribed by well known optical theory for ideal results.

The actual thickness of the reflection reducing coating is computed by dividing the desired optical thickness by the index of refraction for the infrared wave length of principal interest in the material of the coating. A list of actual coating thicknesses for various materials is shown in the table below. The infrared wavelength radiation of principal interest is taken as 2 microns and the multiple as one. The symbol $\lambda$ is used to denote wavelength.

| Coating Material | Refraction Index for Infrared Radiation $\lambda=2$ Microns | Optical Thickness for $\lambda=2$ Microns | Mechanical Thickness in Microns |
|---|---|---|---|
| | | Microns | |
| $MgF_2$ | 1.36 | .5 | .37 |
| $LiF$ | 1.38 | .5 | .36 |
| $SiO$ | 1.5 | .5 | .33 |
| $Sb_2S_3$ | 3. | .5 | .17 |
| $Sb_2O_3$ | 1.8 | .5 | .28 |
| $As_2S_3$ | 2.42 | .5 | .206 |
| $As_2O_3$ | 1.8 | .5 | .28 |

By "radiation of principal interest" as used herein and in the claims is meant the infrared radiation of wavelength most susceptible of detection and includes infrared radiation of wave lengths between about one and five microns. An "odd multiple of one-fourth" is to be interpreted to include one as an odd multiple.

In operation the cell is included in the circuit of a signal detection device and mounted in the path of the target radiation. Radiation striking the reflection reduction coating 13, which is transparent to infrared radiation, passes into the photo-conductive coating 11 where it is transformed into electrical energy which is detected as a signal. The coating 13 being of the prescribed material and thickness prevents the reflection of an appreciable amount of radiation which would be ordinarily reflected at the first surface of the photoconductive coating because of its high index of refraction. As photoconductive materials are somewhat transparent to infrared radiation, some of the radiation striking the photoconductive coating passes on through the thin coating. The radiation passing through the photoconductive coating 11 passes through the transparent base 10 and strikes the reflecting surface 12 from which it is reflected back through the base and into the photoconductive coating 11 to produce additional electrical energy. The result of the additive effect of the reflection reducing coating in preventing unwanted reflection of incident radiation and the reflecting surface introducing more radiation into the photoconductive coating 11 causes an overall increase in the efficiency of the cell, permitting the detection of weaker target signals. In addition to the increased efficiency resulting from the application of a reflection reduction coating, the coating serves the additional function of protecting the photoconductive coating from exposure, thus eliminating the necessity of enclosing the cell in an evacuated envelope.

While the invention has been illustrated by a specific structure, the application of the invention may take the form of various structures, and the invention is by no means intended to be limited to the structure shown.

It is thus seen that there has been provided an infrared detector cell of increased efficiency in which reflection of incident radiation has been minimized and a protective coating has been furnished for the photoconductive coating.

Obviously, many modifications and variations of the present invention are possible in the light of the above teachings. It is, therefore, to be understood that within the scope of the appended claims the invention may be practiced otherwise than as specifically described.

What is claimed is:

1. In a photoconductive cell, in combination, a supporting base of dielectric material, a coating of a photoconductive material on one side of said base, and a reflection reducing surface coating of dielectric material transparent to infrared radiation on said photoconductive material.

2. A photoconductive cell comprising a supporting base of dielectric material, a coating of photoconductive material on one side of said base, and a reflection reducing surface coating on said photoconductive coating consisting of a material having an index of refraction for infrared rays less than that of said photoconductive material.

3. A photoconductive cell comprising a supporting base of dielectric material, a coating of photoconductive material on one side of said base, and a reflection reducing coating on said photoconductive material having an optical thickness for the radiation of principal interest which is an odd multiple of one-fourth of the wave length of radiation of principal interest and consisting of a material having an index of refraction for the radiation of principal interest less than that of the photoconductive material.

4. A photoconductive cell for infrared radiation comprising a supporting base of dielectric material, a coating of photoconductive material on one side of said base consisting of a binary compound of lead and a member of the sulphur group, and a reflection reducing coating on said photoconductive material having an optical thickness for the radiation of principal interest which is an odd multiple of one-fourth of the wave length of radiation of principal interest and consisting of a material having an index of refraction for the radiation of principal interest less than that of the photoconductive material for the radiation of principal interest.

5. A photoconductive cell comprising a supporting base of dielectric material, a coating of photoconductive material on one side of said base comprising a compound from the class consisting of lead sulfide, lead telluride and lead selenide, and a reflection reducing coating on said photoconductive coating having an optical thickness for the radiation of principal interest which is an odd multiple of one-fourth the wave length of radiation of principal interest and consisting of a material having an index of refraction between about 1.3 and about 2.5 for the wave length of radiation of principal interest.

6. A photoconductive cell for infrared radiation comprising a supporting base of a dielectric material, a coating of photoconductive material on one side of said base comprising a compound from the class consisting of lead sulfide, lead selenide and lead telluride, and a reflection reducing coating on said photoconductive material consisting of a dielectric, solid compound transparent to infrared radiation, having an index of refraction between 1.3 and 2.5 and adaptable for application as a coating to said photoconductive material.

7. A photoconductive cell for infrared radiation comprising a supporting base of dielectric material transparent to infrared radiation, a reflecting surface on one side of said base facing said base and adapted to reflect radiation through said base, a coating of photoconductive material on the opposite side of said base, and a reflection reducing surface coating on said photoconductive coating.

8. A photoconductive cell for infrared radiation comprising a supporting base of dielectric material transparent to infrared radiation, a reflecting surface on one side of said base facing said base and adapted to reflect radiation through said base, a coating of photoconductive material on the opposite side of said base, and a reflection reducing coating on said photoconductive coating consisting of a material having an index of refraction for the radiation of principal interest less than that of the said photoconductive material.

9. A photoconductive cell for infrared radiation comprising a supporting base of dielectric material transparent to infrared radiation, a reflecting surface on one side of said base facing said base and adapted to reflect radiation through said base, a coating of photoconductive material on the opposite side of said base comprising a compound from the class consisting of lead sulfide, lead telluride and lead selenide, and a reflection reducing coating on said photoconductive material having an optical thickness for the radiation of principal interest which is an odd multiple of one-fourth of the wave length of radiation of principal interest and consisting of a material having an index of refraction for the radiation of principle interest between unity and that of the photoconductive material.

10. A photoconductive cell for infrared radiation comprising a supporting base of dielectric material transparent to infrared radiation, a reflecting surface on one side of said base facing said base and adapted to reflect radiation through said base, a coating of photoconductive material on the opposite side of said base comprising a compound from the class consisting of lead sulfide, lead telluride and lead selenide and a reflection reducing coating on said photoconductive material having an optical thickness for the radiation of principal interest which is an odd multiple of one-fourth the wave length of radiation of principal interest and consisting of a dielectric, solid compound transparent to infrared radiation, having an index of refraction for the radiation of principal interest between 1.3 and 2.5 and adaptable for application as a coating to said photoconductive material.

11. A photoconductive cell for infrared radiation, comprising, a supporting base of dielectric material transparent to infrared radiation, a reflecting surface of aluminum on one side of said base operative to reflect radiation through said base, a coating of lead sulphide on the opposite side of said base, and a coating of silicon monoxide on said lead sulphide coating having a thickness of about .33 microns.

References Cited in the file of this patent

UNITED STATES PATENTS

| | | |
|---|---|---|
| 2,137,466 | Tonnies | Nov. 22, 1938 |
| 2,544,261 | Gibson | Mar. 6, 1951 |
| 2,547,173 | Rittner | Apr. 3, 1951 |